March 23, 1965 H. L. SMITH, JR 3,174,228
AUTOMATIC HEATER CONTROL FOR A PAPER DRYING SYSTEM
Filed Oct. 25, 1960 4 Sheets-Sheet 1

INVENTOR
Horace L. Smith, Jr.

BY *Strauch, Nolan & Neale*
ATTORNEYS

March 23, 1965   H. L. SMITH, JR   3,174,228
AUTOMATIC HEATER CONTROL FOR A PAPER DRYING SYSTEM
Filed Oct. 25, 1960   4 Sheets-Sheet 2

INVENTOR
Hoarce L. Smith, Jr.

BY *Strauch, Nolan & Neale*
ATTORNEY

March 23, 1965     H. L. SMITH, JR     3,174,228
AUTOMATIC HEATER CONTROL FOR A PAPER DRYING SYSTEM
Filed Oct. 25, 1960     4 Sheets-Sheet 3
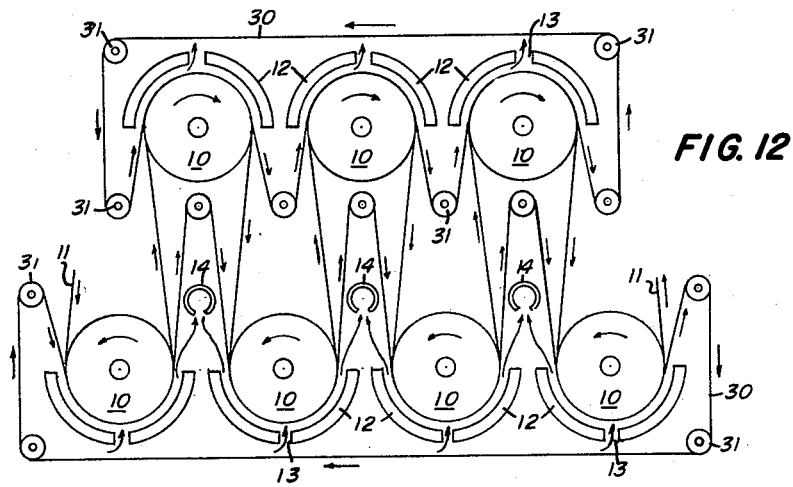
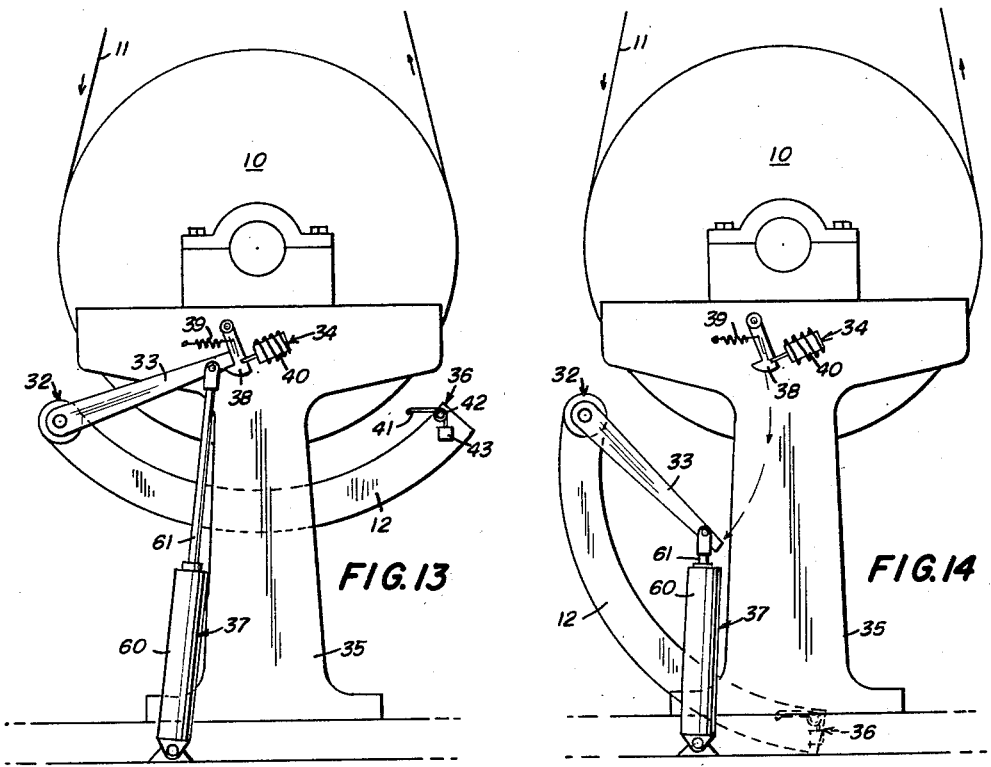
INVENTOR
HORACE L. SMITH, JR
BY Fisher, Christen & Goodson
ATTORNEYS March 23, 1965  H. L. SMITH, JR  3,174,228
AUTOMATIC HEATER CONTROL FOR A PAPER DRYING SYSTEM
Filed Oct. 25, 1960  4 Sheets-Sheet 4

(VALVE POSITION FOR RAISING SHELL)

(VALVE POSITION WHEN SHELL IS RAISED AND LOCKED)

INVENTOR
HORACE L. SMITH, JR.

BY Fisher, Christen + Goodson
ATTORNEYS

United States Patent Office 3,174,228
Patented Mar. 23, 1965

3,174,228
AUTOMATIC HEATER CONTROL FOR A PAPER DRYING SYSTEM
Horace L. Smith, Jr., Richmond, Va., assignor to Hupp Corporation, Cleveland, Ohio, a corporation of Virginia
Filed Oct. 25, 1960, Ser. No. 64,965
5 Claims. (Cl. 34—48)

This application is a continuation-in-part of application Serial No. 846,084, filed October 13, 1959, now abandoned.

This invention relates to a system for heat-treating continuous paper sheets and, more particularly, to systems, apparatus for and improvements in drying or otherwise heat-treating continuous sheets of paper.

The drying of continuous paper sheets is normally carried out by passing them over a series of drying rolls which are heated internally by steam. This procedure is not particularly efficient especially when high speed operation is desired or required. The use of steam-heated drying rolls is plagued by insoluble problems, such as the formation of heat transfer barriers, in the form of condensate layers thrown against the inner walls of the rolls by centrifugal force, which limit the amount of heat passing from the steam to the paper sheet being dried. Special devices for removing the layer of condensate have not been completely successful, serving only to reduce the effects of the problem but not to eliminate it. Increases in steam pressure in attempts to increase the temperature gradient from the steam to the paper sheet and thus increase the amount of heat transfer have also met with little success, since increases in steam pressure require corresponding increases in the wall thickness of the drying rolls for added strength, thereby further increasing the heat barrier between the steam and the paper being dried.

In passing over the rolls, first one face of the paper sheet is in direct contact with a heating roll and then the other face is contacted with the next succeeding roll. Moisture at and near the surface of the face contacting a heating roll is vaporized but cannot escape directly to the atmosphere because of the physical obstruction of the heating roll. As a result, the vapor pressure at the sheet-heating roll interface rises causing the water vapors to migrate to the outer face in an attempt to escape. Some of it does escape but, because the outer face is cooler, much of the water vapors approaching said opposite face condense and are not driven out of the sheet. Additionally, the vapor pressure at the sheet-heating roll interface is released as the sheet leaves the roll and water vapors within the sheet lose their moving force and are unable to escape. As the sheet moves through the cooler regions in the draw between heating rolls, the entrapped water vapor condenses at or near the surface to leave a high concentration of water on the outer face. When the next succeeding heating roll is reached, the face of the sheet previously in contact with the next preceding roll is now exposed to the surrounding atmosphere and the water-laden face previously exposed to the surrounding atmosphere is now in contact with the heating roll. Vapor pressures build up at the sheet-heating roll interface and force water vapors back through the sheet and a similar procedure as described above takes place. The result is that the contained moisture migrates from face to face of the paper sheet with only a portion being liberated each time. After passing over an adequate number of heating rolls, the sheet is eventually dried but not after much of the water vapor has passed back and forth many times through the thickness of the sheet and has been condensed and re-vaporized many times before finally escaping to the atmosphere. A good deal of energy is dissipated in moving the moisture from face to face without fully accomplishing the desired result of removing the maximum amount of moisture in the least amount of time with the expenditure of the minimum amount of energy.

Even the smoothest paper sheets have a roughness of surface which prevent total surface contact with the heating rolls. Rough sheets, such as crepe paper, have extremely rough surfaces and are very difficult to dry by contact with heating rolls. The peaks and valleys always present in the surfaces of paper sheets prevent total contact with the heating roll and the presence of air pockets in the valleys obstruct the passage of heat from the roll to the sheet. As a result, the peaks are heated to a high temperature whereas the valleys receive much less heat. When the paper sheet is moving at a high rate of speed, the air pockets mentioned above tend to smear and, in addition, further air is entrapped between the sheet and the roll as they come into contact. The air film thus formed separates even the peaks from the roll, thereby constituting a heat transfer barrier. This film of air will be gradually dissipated by being forced through the sheet but due to the short contact time of the sheet and the roll, especially under high speed operations, the air-film is never entirely eliminated.

In conventional paper drying machinery, the moisture escapes from the sheet being dried mainly by diffusion, since the sheet surface through which the moisture escapes is below the boiling point of water. Thus, moisture in the form of vapors tend to saturate the air layer covering the sheet and unless removed, restrains further migration of moisture out of the sheet. Consequently, it is general practice to direct a stream of heated, relatively dry air over the sheet to remove the vapor-laden or saturated air layer and replace it with a drier air layer. The air stream must be heated to approximately the temperature of the sheet so as not to chill the sheet and thereby reduce the rate of diffusion. The heated air is normally applied in the direction of travel of the sheet and exits with the sheet. Even though the air stream is relatively dry on entering, it mingles with the vapor-laden or saturated air layer and itself picks up additional moisture to thereby restrain further diffusion. While the use of a heated, relatively dry air stream does assist in removing vapors and somewhat increasing the rate of diffusion of moisture from the sheet, diffusion is still restrained by vapor-containing air overlying the sheet.

In accordance with this invention, a novel paper drying system, apparatus and method and improvements in paper drying are provided which permit the use of higher speeds of travel of continuous paper sheets, and more efficient and less costly drying. Further, a new system, apparatus and method of drying paper in continuous sheets are provided wherein an improved application of radiant heat is employed. The invention also provides improvements in continuous sheet paper drying wherein the speed of paper travel and drying capacity of existing drying machinery can be greatly improved without drastic changes in the machinery or auxiliary equipment. Through the practice of this invention, large volumes of water are removed in the shortest possible time from continuous sheets of paper traveling at high speeds. Also there is provided means for supporting the continuous wet sheet of paper against breakage without appreciably reducing the accessibility of radiant heat to the sheet or the escape of vapor from the sheet. The invention further provides paper drying apparatus which averts the jamming of paper in the apparatus when a break in the sheet occurs and at the same time indicates the location of the break. This additional feature eliminates damage to the drying apparatus and accessories while reducing the apparatus down-time needed for clearing the jam.

It is therefore an object of this invention to provide a drying system, apparatus and method wherein drying of paper sheets is accomplished at considerably higher rates than heretofore obtained with conventional multi-drying roll machines.

Another object is to provide a system, apparatus and method of drying which obviates the waste of heat energy normally incurred in conventional drying machines.

Another object of this invention is to eliminate the necessity of passing hot air streams over the paper sheet surface to remove saturated air layers.

A further object is to provide a novel system, apparatus and method for drying fast-moving, continuous paper sheets.

Another object is to provide a system, apparatus and method for increasing the drying capacity of existing multi-heating roll driers.

An object is to provide a system, apparatus and method for drying continuous paper sheets at very low cost per pound of water evaporated.

Another object is to provide a system and apparatus for drying continuous paper sheets wherein all parts of the system or apparatus are accessible for maintenance or operational adjustments.

A further object is to provide a drying system and apparatus wherein temperatures are precisely controlled throughout the drying treatment.

A further object is to provide improved radiating apparatus.

Another object is the provision of a method for producing radiations which are conducive to maximum absorption by a continuous wet paper sheet.

Another object is the provision of means whereby the continuous wet paper sheet is well supported against breakage while at the same time being readily accessible to heat radiations and vapor removal.

A further object is to provide means for preventing damage and long tie-ups due to breakage of the continuous paper sheet in the drying apparatus.

Various other objects, advantages and features of the invention are apparent from the following detailed description and the accompanying drawings illustrating a preferred embodiment thereof.

Figure 9:
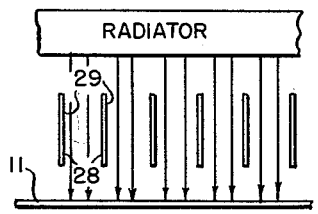
Figure 10:
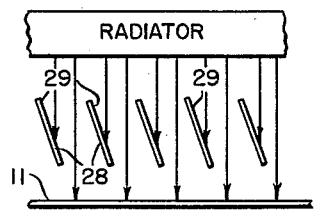
Figure 11:
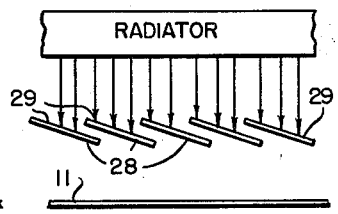

FIGS. 9, 10 and 11 each are diagrammatic elevations illustrating apparatus for precisely controlling heat flow from the radiators to the continuous paper sheet, both of which are also shown.

Figure 15:
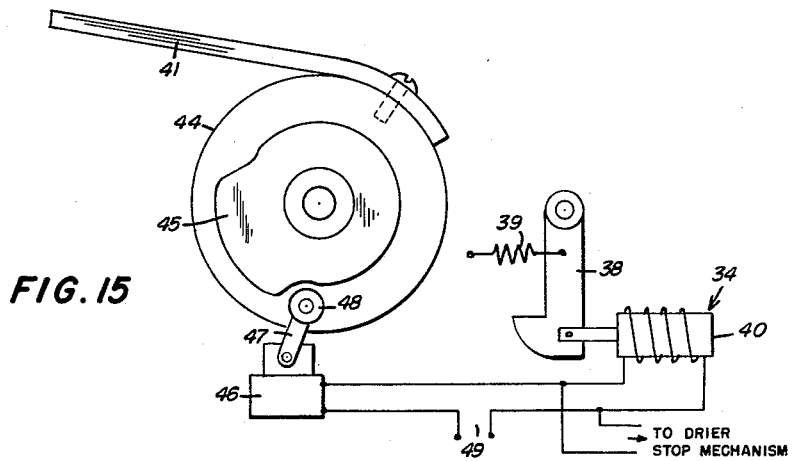
Figure 16:
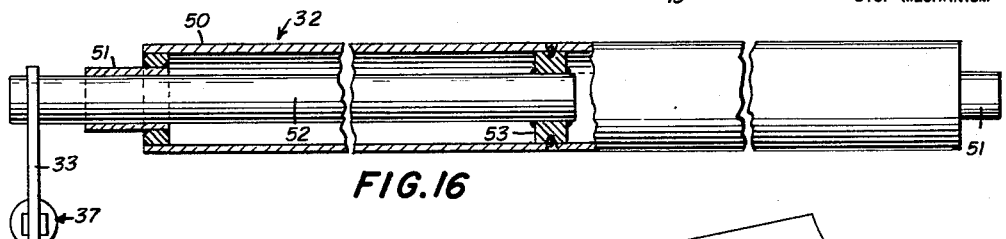
Figure 17:
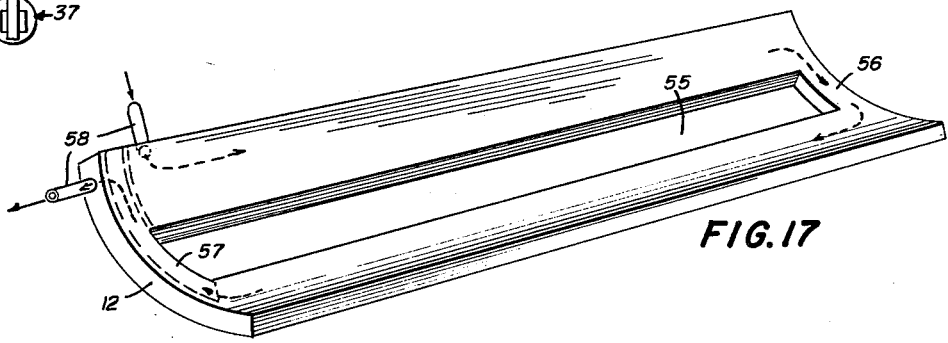
Figure 18:
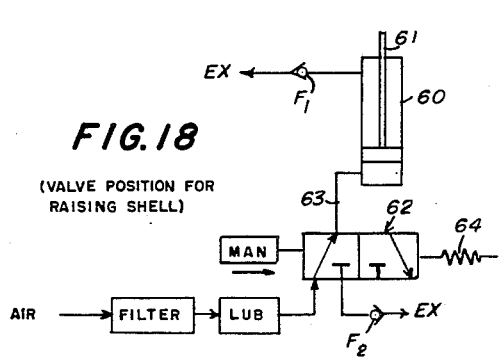
Figure 19:
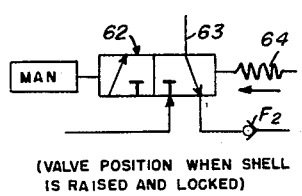

FIG. 12 is a diagrammatic view of drying apparatus including heating rolls, arcuate radiators and the high-tensile strength, open-weave cloth employed to support the continuous paper sheet and press it against the heating rolls;

FIG. 13 is a side elevation of one drying roll and arcuate shell in operative position showing one embodiment of retaining means holding the shell in operative position, sensing means in a position to sense a break in the paper sheet and pneumatic means for returning the shell to operative position;

FIG. 14 is a side elevation similar to FIG. 13 showing the shell in its position away from the heating roll;

FIG. 15 is a side elevation of the break sensing device and a diagrammatic view of the electrical connection of said device with the releasable latch device;

FIG. 16 is a cross-sectional view of the torque bar pivot axis of the shell showing the internal construction of the torque bar;

FIG. 17 is a perspective view showing one embodiment of a heat radiating shell having a central vent;

FIG. 18 is a diagrammatic view of the mechanism for moving the shell to its spaced position next to the heating roll showing the three-way valve in position for so moving the shell; and FIG. 19 is a diagrammatic view of the three-way valve shown in FIG. 18 showing the valve in the ready position for moving the shell away from the heating roll upon release of the latch means by the sensing device.

Figure 1:
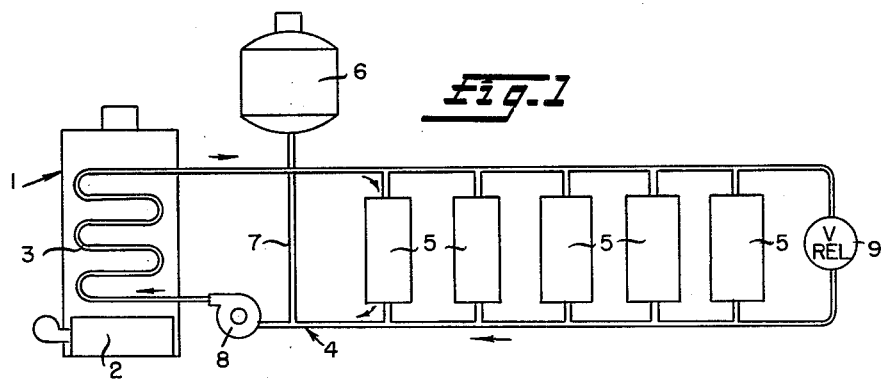
FIG. 1 is a flow and schematic diagram illustrating the over-all paper drying system of this invention.

Referring now to FIG. 1, there is shown a heater 1 comprising a burner 2 and associated heating coils 3 which are connected to the piping network 4. Radiators 5, to be hereinafter more fully described, are connected to the piping network 4 and positioned in relation to a moving continuous sheet of wet paper as also is hereinafter fully described. A vented expansion tank 6 is connected to piping network 4 by pipe 7 to permit expansion and contraction of heat-transfer fluid within the piping network 4 avoiding excessive strains on said network, radiators 5, heating coils 3 and other associated equipment. A recirculating pump 8 moves the fluid within the system and a pressure relief valve 9 releases any undue pressures built up within the system and which the expansion tank 6 cannot handle. Heat-transfer fluid in the system is heated in the coils 3 and circulated to the radiators 5 where it delivers its contained heat and then returns to the coils, the pump 8 providing any necessary moving force.

The heat-transfer fluid employed is stable at both ordinary and high temperatures and can be a gas, e.g., mercury vapor, or a high boiling liquid. Suitable high boiling heat-transfer liquids are the liquid chlorinated hydrocarbons, e.g., Aroclor (essentially tetrachlorobiphenyl), biphenyl ether and the like.

Figure 2:
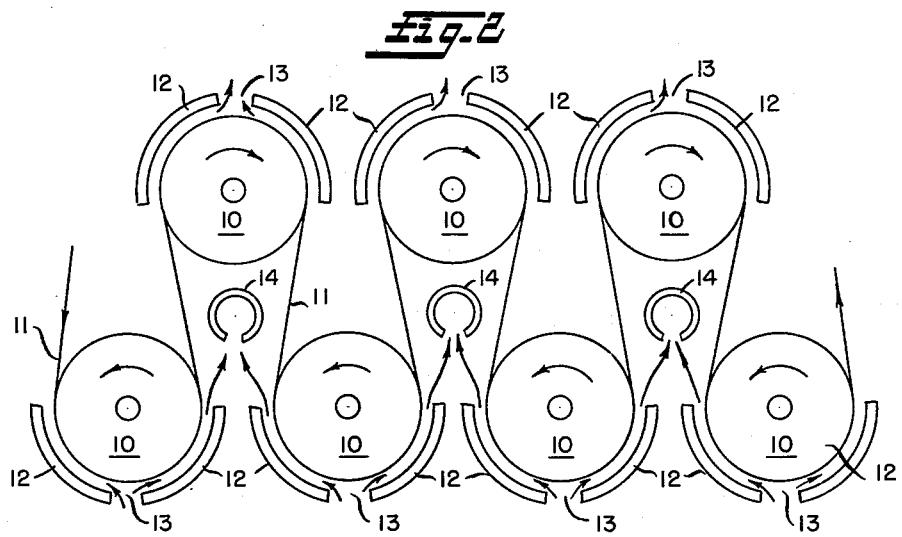
FIG. 2 is a diagrammatic elevation of drying apparatus including heating rolls and arcuate radiators employed in the paper drying system showing them in relation to a continuous paper sheet being dried.

FIG 2 diagrammatically illustrates an important embodiment of the invention. This figure shows drying rolls 10 which can be of a conventional type heated with steam, although they can be supplied with the hot heat-transfer fluid supplied by the piping network 4 shown in FIG. 1. A continuous paper sheet 11 is shown as traveling in the path indicated by arrowheads on said sheet. Arcuate radiators 12 are disposed in spaced relation to the drying rolls 10 and the sheet 11 and are preferably concentric with said rolls as shown, in order to provide uniform heating. These radiators are connected at one end to the hot fluid supply side of the piping network 4 shown in FIG. 1 and at the other end to the return side of said network and are thus heated. There can be only a single arcuate radiator per roll 10, in which case the radiator would extend around the roll 10 from about the tangent point of initial contact of sheet 11 with roll 10 to the tangent point of breaking contact of said sheet and roll. A preferred form of the arcuate radiator is shown, however. In the preferred form, two radiators 12 are provided for each roll 10. Each of the two arcuate radiators 12 extend toward each other around the roll 10, one from about the tangent point of initial contact and the other from about the tangent point of breaking contact. The arcuate radiators 12 extend toward each other in this manner but do not quite reach each other but leave a space 13. Directly below each upper roll 10 there is constructed a vapor removal duct 14. Air enters by convection through the spaces 13 between the arcuate radiators 12 disposed around the lower rolls 10 as steam-air mixture evacuates by convection through ducts 14 from the space between the radiators 12 and the sheet 11. Similarly, steam and air escape by convection from between the upper radiators and the sheet 11.

Figures 3, 4, 5:
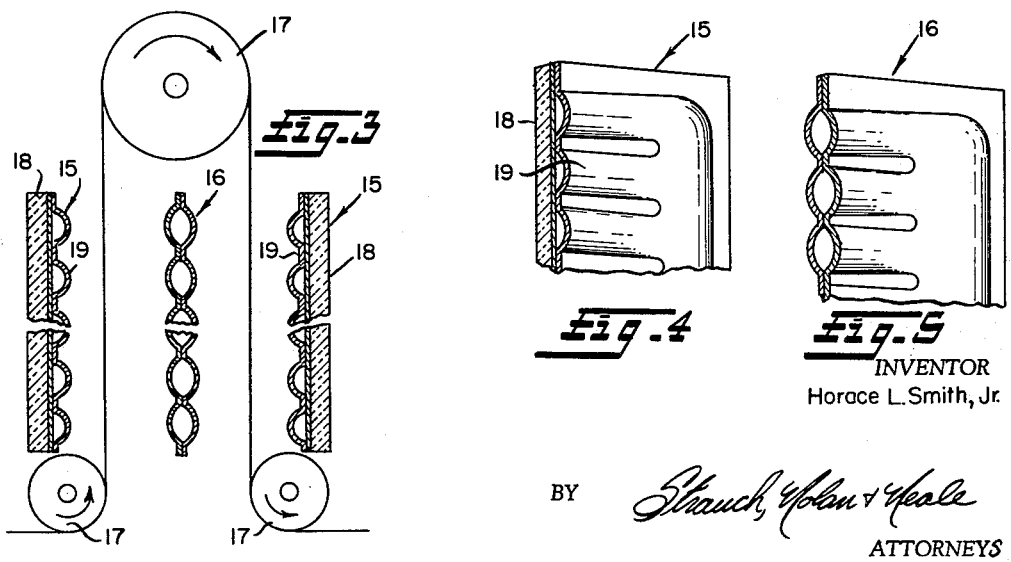
FIG. 3 is a diagrammatic elevation of a different drying apparatus including guide rolls and radiators (in transverse cross-section) employed in the paper drying system showing them in relation to a continuous paper sheet being dried.
FIGS. 4 and 5 are perspective views, respectively, of a single embossed radiator and a double embossed radiator for use in relation with flat traverses of the paper sheet as shown in FIG. 3, portions of said radiators being broken away.

FIG. 3 illustrates two other types of radiators 15 and 16 which can be used in the flat draw between rolls 17. The radiators 15 have an insulated side 18 and a heat-conductive side 19 and are adapted to heat in one general direction. This type is shown in detail in FIG. 4. The radiator 16 radiates heat from both sides which are heat-conductive and is particularly adapted to be disposed between and heat two portions of sheet 11 as shown. FIG. 5 shows the construction of this type in more detail.

The radiating surfaces of the radiators 12, 15 and 16 are coated with a dark substance which is permanent but will not act substantially as an insulator. A preferred coating can be applied by painting the radiating surfaces with a silicone base paint which is heat resistant and which contains a dark pigment such as lamp black. In this manner the radiator surface is provided with a high emissivity coefficient, e.g., as high as about 0.95 in the temperature range of 500° F. to 600° F., and the radiator emits a much larger amount of energy, for example, as measured in B.t.u.'s per square foot of radiating surface, than the uncoated surface.

Figure 6:
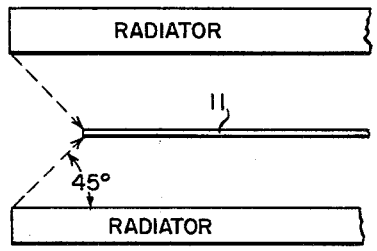
FIGS. 6 and 7 are diagrammatic views illustrating radiators in relation to a continuous paper sheet illustrating means for assuring uniform drying of said sheet.

FIG. 6 illustrates a form of radiator, which can be arcuate 12 or generally planar 15 and 16, wherein equal heating of the entire width of paper sheet 11 is obtained. As shown in the figure, the radiator extends beyond the width of the sheet to an extent that the outer edge of the radiator is in a line with the outer edge of sheet 11, the line making not greater than a 45 degree angle with the radiator.

Figure 7:
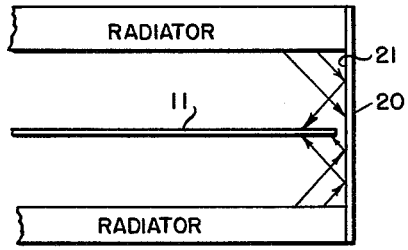

Another means for ensuring even heating over the entire width of sheet 11 is illustrated in FIG. 7. Here, there is shown an end piece 20 having a reflective surface 21 disposed at the end of the radiator and extending at least to the plane of the sheet 11 but not contacting the sheet. In this manner, the reflective surface represents a source of radiations, reflecting radiations which otherwise would pass beyond the sheet 11 back to the sheet.

Figure 8:
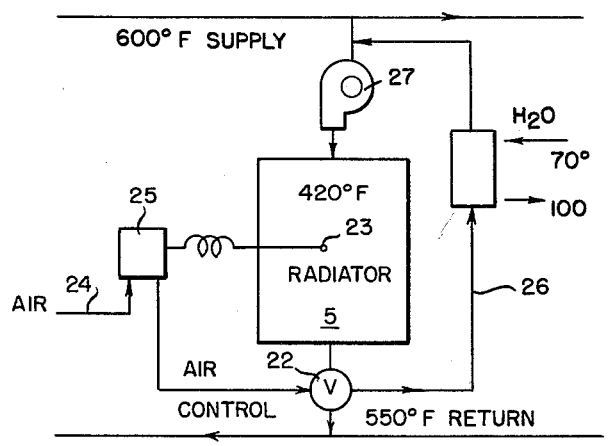
FIG. 8 is a flow and schematic diagram illustrating apparatus for controlling the temperature of the radiators.

FIG. 8 illustrates a temperature control apparatus for controlling the temperature of the heat-transfer fluid in a radiator and thus the amount of energy being radiated. The temperature control apparatus generally comprises an air-actuated, three-way, mixing valve 22, disposed in the return line from the radiator 5 to the heating coils, a temperature sensing means, e.g., a Thermistor, sensing the temperature of fluid inside the radiator 5, an air supply 24 for supplying actuating air to the valve 22, and a control mechanism 25 responsive to the sensed temperature of sensing means 23, said control mechanism controlling the amount of actuating air delivered to the mixing valve 22 in accordance with the sensed temperature, a feed back line 26 from the mixing valve to the hot fluid supply inlet to the radiator 5 and a pump 27 for moving fluid into the radiator 5. Illustrative fluid temperatures of 600° F. for the hot fluid supply, 550° F. for the fluid return in the over-all heating and supply system and 420° F. for the fluid in the particular radiator to which the temperature control apparatus shown in FIG. 8 is applied are given as exemplary of a specific temperature relationship which can be provided by the temperature control apparatus.

FIGS. 9, 10 and 11 illustrate a control device for controlling the amount of heat energy being transmitted from a radiator to a paper sheet 11, the vertical arrows in each figure representing radiations. The control device comprises a series of vanes 28, which can be flat as shown, pivotally mounted between the radiator and the sheet 11. The vanes 28 are mounted to pivot on axes which are parallel to the radiator and when pivoted from a position perpendicular to the radiator (as shown by FIG. 9), begin to intersect and obstruct lines of sight from the radiator to the sheet 11 (as shown by FIG. 10). When pivoted further from the perpendicular to the radiator as shown in FIG. 11, all lines of sight perpendicular to the radiator and extending from the radiator to the sheet 11 are cut off. The surfaces 29 of the vanes 28 adapted to be pivoted to face the radiator are preferably made reflective such that substantially all radiations emitted from the radiator are reflected back when the vanes 28 are in the position shown by FIG. 11. The greater the angle made by the vanes 28 with the perpendicular to the radiator the fewer the radiations allowed to pass from the radiator to the sheet.

The operation of the paper drying system is best described with reference to FIG. 2. Thus, in operation, a paper sheet 11 passes over and is moved by drying rolls 10 which are heated in the customary maner with steam, or which can be heated via circulating a heat-transfer fluid previously described through the drying roll instead of steam. A heat-transfer fluid is heated and distributed as described in reference to FIG. 1 and circulated through the radiators 12 to heat them to the desired radiating temperature. The sheet 11 in contact with a drying roll 10 is heated by said roll to vaporize the contained moisture at and near the sheet-roll interface and thereby build up vapor pressure at the interface. At the same time radiant heat from the radiator 12 heats the outer surface of sheet 11 raising the temperature of the contained moisture therein to the boiling point. Contained moisture at and near the outer surface of sheet 11 vaporizes allowing moisture migrating from below the sheet surface and from the sheet-roll interface to rapidly reach the outer surface and causing said moisture to escape more readily. Vapors escaping from the outer surface of sheet 11 being substantially at the boiling point are of a higher temperature than the air overlying the sheet and quickly rise by convection away from the sheet surface. As the sheet 11 leaves the roll 10, both surfaces of the sheet are at approximately the same high temperature, i.e., around the boiling point.

At the next succeeding drying roll, the sheet surface previously exposed to radiant heat from a radiator 12 is now in direct contact with a drying roll 10 and, vice versa, the surface directly contacting the next preceding drying roll is now exposed to the radiant heat of a radiator 12. Although both surfaces cool somewhat during transit between rolls, the amount of heat and time required to bring the contained moisture of the sheet at the sheet-roll interface to vaporization is considerably lower than when no radiant heat is employed at the next preceding roll. Vapor pressure at the sheet-roll interface builds up rapidly to force moisture contained below the surfaces of the sheet to the outer surface, exposing it to radiant heat emitted from the radiator 12, resulting in vaporization and liberation from the sheet. Again, the vapors leaving the outer surface are at or close to the boiling point and quickly leave the vicinity of the sheet surface after being released therefrom.

The embodiment of the invention illustrated in FIG. 2 allows a rapid and efficient removal of vapors from the vicinity of the surface of the paper sheet being dried. As shown by arrows, vapors escaping from the sheet surfaces at the lower rolls 10 rise by convection and escape through ducts 14, and replacement air enters through spaces 13. Vapors escaping from the sheet surfaces at the upper rolls 10 rise by convection an escape through spaces 13, replacement air entering through spaces between radiators 12 disposed about adjacent drying rolls 10.

In order to reduce or eliminate cooling of the sheet while in transit between drying rolls 10, flat-type radiators 15 or 16 as shown in FIGS. 3, 4 and 5 can be disposed parallel to the sheet 11 between upper and lower rolls 10.

It has ben found that wet paper regardless of color dries fastest when subjected to heat radiations having a wave length of peak energy radiation of at least about 3.0 to 3.5 microns and preferably at least about 4.1. A radiating body sends out radiations of a wide range of wave lengths. For any given temperature, most of the energy radiated is emitted in a narrow wave length band which is designated herein as the wave length of peak energy radiation. Some of the energy radiations, however, are of shorter and some are of longer wave lengths, the amount of energy radiations at the longer wave lengths being about three times that at the shorter wave lengths. In order to provide heat radiations having a wave length of peak energy radiation of at least about 4.1 microns, the radiator is heated to a temperature not greater than about 800° F. As the wave length of peak energy radiation drops off at extremely high temperatures, a considerable amount of energy is wasted as by reflection from the paper sheet. In a particularly advantageous embodiment, temperatures up to at least about 600° F. have been employed. At 600° F. the peak radiation wave length is about 4.9 microns. It has also been found that, in order to provide an optimum heat output from the radiator and, thus, an optimum net flow of heat into the wet paper sheet, the temperature of the radiator must be at least about 500° F.

A high strength, open-weave, endless cloth, such as scrim, can be advantageously used to support the paper sheet as it travels over the drying rolls 10. The endless cloth can be brought into contact with the paper sheet at any point where the sheet will undergo the severest stresses and/or at the point where the sheet is the weakest. For example, the cloth can be brought into supporting contact on the under surface of the sheet as it enters the drier and travels with the sheet until it exists from the drier whereupon the cloth separates from the paper sheet and continues back to the entrance of the drier for re-contact with the sheet entering the drier. Of course, two endless cloths can be used to provide support on both surfaces of the paper sheet.

Alternatively, several continuous cloths can be used each to support the paper sheet along a separate portion of its travel through the drier. An arrangement such as this is shown in FIG. 12 wherein an endless scrim 30 in a continuous loop passes around rollers 31 and over the paper sheet 11 as it passes over the drying rolls 10. Several such loops of scrim 30 can be used in tandem along the entire length of travel of the paper sheet or any portion thereof desired. As shown in FIG. 12 such loops of scrim 30 can be used to contact and support the upper as well as the lower surfaces of the paper sheet.

Not only does the high-tensile strength, open-weave cloth support the paper sheet, it also can be used to press the sheet against the drying rolls 10. In this connection suitable tensioning devices operating on the cloth can be employed. The open-weave nature of the cloth, e.g., scrim, allows heat radiations from the shells 12 to penetrate and operate on the paper sheet. Similarly, this open-weave nature allows evaporated moisture to escape from the sheet and be evacuated as hereinbefore described. The endless cloth can be separately dried after it separates from the paper sheet and before it returns to re-contact the sheet, although in most instances such separate drying is not necessary.

A considerable amount of difficulty and damage can result from a break in the paper sheet as it passes through the drier. Jams caused by a break in the paper sheet causes the paper to pile up in the space between the shell and the heating roll, and with the high speeds used in driers the pile-up of paper is quite rapid, being capable of filling quite a large portion of the drier in a short time. The difficulties in removing piled-up paper, called broke, from the areas in and around the heating rolls, shells and associated parts are obvious. Damage can occur when the heating roll at the site of the jam continues to turn and ram more and more paper into the narrow space between the heating roll and the shell. This condition can result in apparatus other than that particularly described herein. For example, the shell need not be a heat radiating shell but could be an air plenum for directing sprays of air onto the paper sheet as it passes over the heating roll. In any event the jam release and preventing apparatus to be described hereinafter is applicable to any apparatus wherein a continuous paper sheet is passed over a roll which is in closely spaced association with an arcuate shell approximately concentric with the roll.

FIGS. 13, 14 and 15 illustrate one embodiment of a jam release and preventing apparatus which will avoid or alleviate jams of paper between a roll over which a continuous sheet of paper is passing and an arcuate shell approximately concentric therewith. In these figures, a roll 10, for example, as previously described, is rotatably supported and a continuous paper sheet 11 contacts and travels around said roll, as also previously described. The heat radiating arcuate shell, as previously described, is mounted on a torque bar 32 which is rotatably mounted at the side of roll 10 where the paper sheet 11 leaves said roll and on a frame which is fixed with relation to the rotatable mount of the roll 10. An operating arm 33 is fixed to the torque bar 32 and extends to a latch mechanism 34 mounted on a standard 35, which is fixed in relation to the frame mounting the torque bar 32 and the roll 10. A sensing device 36 is mounted on the shell 12 at the side of roll 10 where the paper sheet 11 meets said roll. A return mechanism 37 is also illustrated in FIGS. 13 and 14 and will be more fully described hereinafter.

The latch mechanism 34 comprises a latch 38 which is pivotally mounted on the standard 35 and engages the arm 33 to hold the shell 12 in closely spaced association with the roll 10 as shown in FIG. 13. The latch 38 is biased by spring 39 into retaining contact with the arm 33. A latch release solenoid 40 is connected to the latch 38 for pulling the latch against the bias of spring 39 upon signal from the sensing mechanism that a break has occurred, thereby releasing the arm 33 to permit the shell 12 to pivot downwardly, in this instance, by the force of its gravity.

The sensing mechanism 36 comprises a plate 41 pivotally mounted on the shell at the point 42 and extends substantially the entire length of the shell. The sensing element 41, instead of being a plate, could be a series of fingers which are interconnected. A counterbalance 43 is connected to the sensing element 41 to pivot said sensing element out into the area between the roll 10 and the shell 12. Of course, the sensing element is properly spaced away from the roll 10 to permit momentary slacks in the sheet of paper without tripping the latch 38. The sensing mechanism 36 is shown in more detail in FIG. 15, which shows the sensing element 41 connected to a shaft 44 to which is connected a cam 45 on one end of the shaft 44. A microswitch 46 having a pivoted switch arm 47 with a wheel 48 riding on the cam surface is provided in an electrical circuit to the latch releasing solenoid 40 so that when the raised portion of the cam 45 bears against the wheel 48, the microswitch 46 connects the solenoid 40 to a source of electrical power 49 to energize the solenoid 40 and trip the latch 38, releasing the arm 33 and shell 12 for downward movement away from the roll 10. Thus, when a break occurs, the paper sheet 11 engages the sensing element 41 to rotate it in a downward direction, which rotation causes the raised portion of cam 45 to engage and pivot the switch arm 47, thus actuating the microswitch 46 to close the circuit and energize the solenoid 40.

A preferred torque bar is shown in detail in FIG. 16. This preferred torque bar comprises a hollow shaft 50 which is journaled at each end 51 on a frame (not shown), which is fixed in relation to the mount for the roll 10. The shell 12 (not shown) is fixed to the hollow shaft 50. A drive shaft 52 passes through one end of the hollow shaft 50 and is drivably connected to a central portion of the hollow shaft 50 as shown at 53. The drive shaft 52 extends beyond the end of the hollow shaft 50 and is connected to the arm 33. Thus, a more positive pivoting of the shell 12, particularly in raising the shell by means of the return mechanism 37, is obtained with equal angular displacement of the torque bar 32 at its ends and also of the shell at its outer ends. With this type of construction for the torque bar, it has been found that the angular twist of the torque bar is only ¼ of what it would be if the pivoting force was applied to one end of the bar instead of to a central portion of the bar.

As pointed out hereinabove, the shell 12 can be a singular heat radiating arcuate shell or it can be singular air plenum for directing air sprays onto the paper sheet 11. Although FIGS. 13 and 14 show a single arcuate shell, similar mechanisms can be employed on the double arcuate shells, as shown and described in FIGS. 2 and 12, or it can be a similar arcuate heat radiating shell having a central vent permitting the passage of air from one side of the shell to the other. A suitable shell of this latter type is illustrated in FIG. 17. In this figure, the arcuate shell 12 is provided with a central vent 55. A channel 56 is provided at one end of the shell to permit passage of heating fluid from one side of the shell to the other. As shown, a second channel 57 is provided at the opposite end of the shell to permit exiting of the heating fluid. Suitable connections such as flexible tubing 58 are provided at the appropriate locations, as shown, to introduce a heating fluid for circulation through the shell 12.

As also shown in FIGS. 13 and 14, a return mechanism 37 is provided for returning the shell 12 to its operative position relative to the roll 10 after a jam has been cleared and the drying operation is to be recommenced. The return mechanism shown in this instance comprises a pneumatic cylinder 60 and its co-operating piston rod 61, which is pivotally connected to the arm 33. The cylinder 60 is pivotally connected at a lower fixed point, such as the frame on which the standard 35 is mounted. Of course, the cylinder 60 can be hydraulically operated instead of pneumatically operated, if desired.

FIGS. 18 and 19 illustrate the operation of the return mechanism 37. In FIG. 18, one end of the cylinder 60 is connected through a conduit 63 to three-way valve 62 which, as shown here, is manually operated. The other end of the cylinder 60 is connected to exhausts through a flow control F–1. As shown in FIG. 18, the heat radiating shell is in its lower jam releasing position and the three-way valve 62 is in the position for raising the heat radiating shell. The valve 62, as shown in FIG. 18, connects the conduit 63 to an air supply through suitable filtering and lubricating devices to pressurize the lower section of the cylinder 60 and raise the rod 61, thus raising the shell 12. The valve 62 is biased by spring 64 to return to the shell lowering position after manual operation of the valve has ceased to place the cylinder 60 in condition for permitting the lowering of the shell 12 upon release of the latch 38 through operation of the sensing mechanism. FIG. 19 illustrates the portion of valve 62 after the shell 12 has reached its upper operative position and is retained there by the latch 38, which engages the arm 33 as previously described. In this position, the cylinder 60 is depressurized by the exhaust of the fluid in the lower portions of said cylinder, through the conduit 63, the three-way valve 62 and flow control F–2 to exhausts. In this condition, the cylinder 60 will permit the shell 12 to pivot downwardly by its gravity upon actuation of the sensing mechanism 36 and latch mechanism 34. Flow controls F–1 and F–2, respectively, control the rate of raising the shell and lowering the shell. Of course, the shell 12 can be biased by spring action instead of gravity to pivot away from the roll 10 upon release of the latch 38.

On those occasions when a paper sheet which is moist with an inflammable solvent is being dried, it will be desirable to substitute the electrical system associated with the latch release mechanism and sensing mechanism with a suitable pneumatic system. In this regard, the microswitch 46 is replaced with a cam operated pilot valve which is acted on by the cam 45 through a similar arrangement as the wheel 48 and arm 47 to supply fluid pressure to a cylinder and associated piston rod which replaces the solenoid 40. In this way, movement of the switch arm 47 by action of the raised portion of the cam 45 on the wheel 48 actuates the pilot valve which, in turn, pressurizes the cylinder, the associated piston rod of which is connected to the latch 38 to trip the latch and release the arm 33. It will also be desirable to provide a suitable mechanism for stopping the drying rolls 10 upon actuation of the sensing mechanism 36 by a break in the paper sheet 11. Any suitable stopping mechanism responsive to the sensing mechanism 36 can be employed and, if desired, can be electrically operated by electrical connection in parallel with the solenoid 40, as shown in FIG. 15, or it can be a pneumatic system, as described above. It is preferable to provide a separate sensing mechanism which actuates an individual latch mechanism for each drying roll and associated arcuate shell. In this manner, only that arcuate shell wherein a jam occurs or begins to occur is actuated or dropped away from the drying roll 10 and all other shells remain in their operative position unless, of course, a jam occurs with respect to another shell. Thus, not only does the jam release prevent or release jams, it also indicates the site of the jam, thus saving time and effort of operating personnel in locating and clearing the jam.

Conventional multi-drying roll paper driers can be readily modified in accordance with this invention to provide arcuate, high temperature radiators and the accessories of the type described. The drying capacity and speed of the drier is greatly increased and the cost per pound of water evaporated is considerably decreased. Flat-type radiators 15 and 16 can also be installed in the conventional driers to further increase drying capacity and speed.

While the present invention has been described with reference to the specific embodiments shown by the drawings, various modifications and alterations can be made to the illustrated embodiments without departing from the scope of this invention. Most important are the substantial simultaneous heating by radiation of the exposed face of the paper sheet while heating the opposite face by pressure contact with a hot surface such as a drying roll and permitting the easy escape of evaporated moisture from around the heating rolls. Pressure-contact heating builds up vapor pressure at and near the interface between the face of the sheet and the hot surface to force internally contained moisture to migrate to the exposed face of the sheet. Moisture at the exposed face is boiled off by the heat radiations directed at said face and readily escapes as steam. The steam liberated from the sheet being higher in temperature than the surrounding air rises by convection to be replaced by drier air. Thus, there is no need for a forced flow of hot, drier air over the sheet to sweep away air saturated by vapors diffusing from the sheet surface as is encountered in heretofore known drying machines. The application of radiant heat of sufficient intensity to boil off surface moisture lessens or eliminates moisture condensation and a moisture concentration build-up on the outer face of the sheet and lessens or eliminates reheating to first vaporize when said face next contacts the succeeding drying roll. Little or no heat of vaporization, therefore, is lost to the surrounding air.

Although steam can be employed to heat the drying rolls, further efficiencies are obtainable by substituting a heat-transfer fluid as previously described in place of steam. By the use of a heat-transfer fluid, far less heat is lost in transit and such problems as removal of condensate from the drier and returning it to the boiler do not exist. Additionally, much higher temperatures are obtainable without requiring correspondingly large increases in pressure and lighter construction materials can be used. Conduction losses are also at a minimum since lighter construction materials can be used for the heating rolls and/or radiators.

Furthermore, although the arcuate radiators 12 are shown as extending from the tangent point of initial contact of the paper sheet 11 and the drying roll 10 to the tangent point of breaking contact of said sheet and roll, the radiator can extend beyond these points and thus heat larger areas of the sheet.

What is claimed is:

1. System for drying a continuous wet paper sheet, comprising, a drying roll for pressure-contacting said sheet, a high temperature heat-radiating shell disposed in spaced relationship partially around said drying roll and said sheet thereon, said shell being shaped substantially concentrically with said drying roll and having an essentially central opening to permit natural convection in the air-space between said sheet and said shell for the removal by convection of vapors given off by said sheet, means for circulating a heat-transfer fluid at temperatures up to at least 600° F. through said heat-radiating shell, means for heating said heat-transfer fluid, means for heating said drying roll, a high-tensile strength, open-weave cloth traveling with said paper sheet to support said sheet and press it against said drying roll while permitting radiant energy from said shell to reach said sheet and vapors liberated from said sheet to escape, and release means responsive to a break in said paper sheet for moving said shell away from said heating roll to prevent jamming of paper betwen said shell and heating roll, said release means including a hollow shaft journalled at each end and disposed substantially parallel to the axis of said heating roll, said hollow shaft being connected to and supporting said shell for pivotal movement away from said heating roll, and a second shaft disposed within and connected to an intermediate portion of said hollow shaft, one end of said second shaft extending beyond one end of said hollow shaft and being connected to fluid means for returning said shell to its original position.

2. System for drying a continuous wet paper sheet, comprising, a drying roll for pressure-contacting said sheet, a high temperature heat-radiating shell assembly disposed in spaced relationship over said drying roll and said sheet, said shell assembly being shaped substantially concentrically with said drying roll and so shaped and disposed with relation to said roll and said sheet as to provide an open passage vertically aligned with the axis of said roll to permit the escape by convection of vapors given off by said sheet, means for circulating a heat-transfer fluid at temperatures up to at least 500° F. through said heat-radiating shell assembly, means for heating said heat-transfer fluid, means for heating said drying roll, and an end piece having an inwardly disposed reflector surface extending from the end of said radiating shell assembly to at least the plane of said sheet.

3. The system for drying a continuous wet paper sheet comprising a plurality of drying rolls for pressure-contacting said sheet, said rolls being disposed in parallel upper and lower sets, said sheet passing over said drying rolls in pressure contact therewith, a pair of heat-radiating shells disposed in spaced relationship to each of said drying rolls and said sheet, and disposed in spaced relationship with each other to provide an opening substantially vertically aligned with the axes of said rolls to permit the escape by convection of vapors given off by said sheet, said heat-radiating shells being shaped substantially concentrically with said drying rolls, means for circulating a heat transfer fluid through said heat-radiating shells, means for heating said heat transfer fluid, means for heating said drying rolls, and a temperature control apparatus for at least one pair of heat radiating shells comprising means for recirculating a portion of heat transfer fluid exiting from said shells back into said shells, flow control means for controlling the proportion of heat transfer fluid exiting from said shells to be re-circulated and means responsive to the temperature of the heat transfer fluid within said one pair of radiating shells for controlling said flow control means to increase the proportion of re-circulated heat transfer fluid when the temperature of heat transfer fluid within the said one pair of radiating shells increases above a predetermined temperature.

4. System for drying a continuous wet paper sheet, comprising, a drying roll for pressure contacting a sheet, a high temperature heat radiating shell assembly disposed in spaced relationship partially surrounding said drying roll, said shell assembly being shaped substantially concentrically with said drying roll, means mounting said shell assembly for movement toward and away from said roll to permit the removal of broke from the space between said shell assembly and said drying roll, means for circulating a heat transfer fluid at temperatures of at least 500° F. through said heat radiating shell assembly, means for heating said heat transfer fluid, means for heating said drying roll, and a temperature control apparatus comprising means for re-circulating a portion of said heat transfer fluid exiting from said shell assembly back into said shell assembly, and control means for controlling the proportion of heat transfer fluid exiting from said shell assembly to be re-circulated, and means responsive to the temperature of the heat transfer fluid within said shell assembly for controlling said flow control means to increase the proportion of re-circulated heat transfer fluid when the temperature of said heat transfer fluid within said shell assembly increases above a predetermined temperature.

5. The structure according to claim 4 together with a reflector having an inwardly disposed reflective surface extending inwardly from the end of said radiating shell assembly toward the plane of said sheet.

References Cited by the Examiner

UNITED STATES PATENTS

| 1,525,483 | 2/25 | White | 34—116 X |
| 1,830,287 | 11/31 | Ohlin | 34—18 |
| 1,961,182 | 6/34 | Williams | 34—116 X |
| 2,211,573 | 8/40 | McGrath. | |
| 2,479,913 | 8/49 | Doyle | 34—87 X |
| 2,578,633 | 12/51 | Mauffre | 34—122 X |
| 2,781,174 | 2/57 | Smith. | |
| 2,928,185 | 3/60 | Drew | 34—43 |

FOREIGN PATENTS

| 291,154 | 7/14 | Germany. |
| 779,326 | 7/57 | Great Britain. |
| 816,794 | 7/59 | Great Britain. |

NORMAN YUDKOFF, *Primary Examiner.*

CHARLES E. O'CONNELL, *Examiner.*